Oct. 2, 1923.
J. B. RILEY
ADJUSTABLE AXLE
Original Filed July 28, 1921
1,469,698
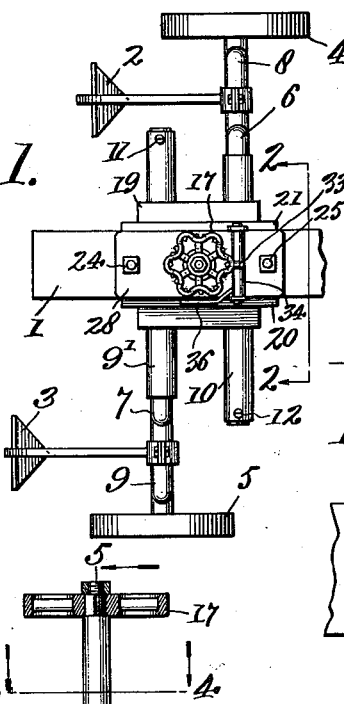
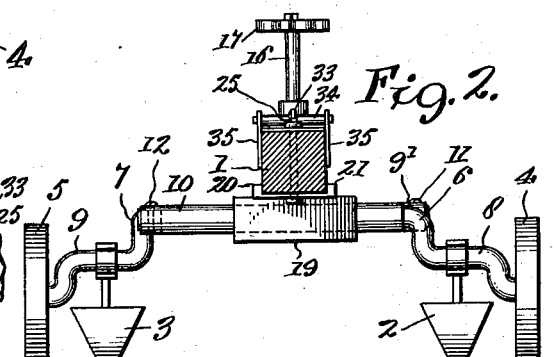
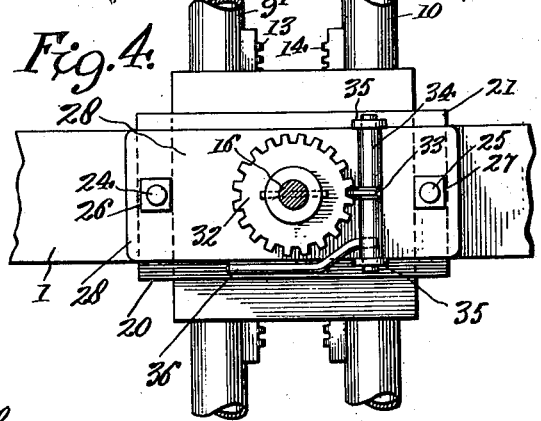
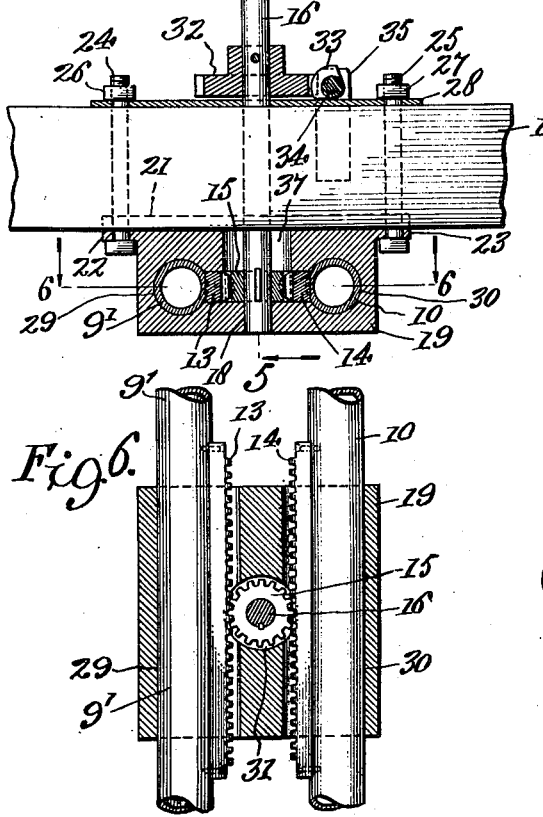
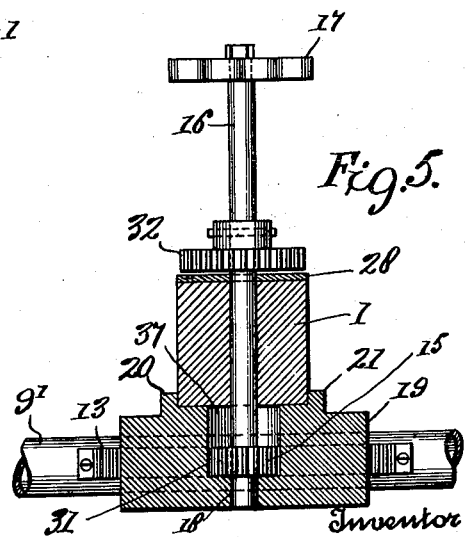
John B. Riley
by Wilkinson & Giusta
Attorneys.

Patented Oct. 2, 1923.

1,469,698

UNITED STATES PATENT OFFICE.

JOHN B. RILEY, OF RIDGELY, TENNESSEE.

ADJUSTABLE AXLE.

Application filed July 28, 1921, Serial No. 488,205. Renewed December 12, 1922.

*To all whom it may concern:*

Be it known that I, JOHN B. RILEY, a citizen of the United States, residing at Ridgely, in the county of Lake and State of Tennessee, have invented certain new and useful Improvements in Adjustable Axles; and I do hereby declare the following to be a full, clear, and exact description of the invention, such as will enable others skilled in the art to which it appertains to make and use the same.

The present invention relates to improvements in adjustable axles for cultivators or other agricultural implements or for other vehicles to which it may be applied, and has for an object to provide an improved attachment for the arched axle of a cultivator or like farming implement for the purpose of enabling the operator to adjust the wheels and the plows or shovels toward or away from each other as may be required in the plowing or cultivation or fields of different characters.

For instance, the middles vary in width as do also the plant rows themselves, and the invention is made to compensate for variations in the same whereby the shovels may be brought to correct positions to carry on the proper cultivation of the plants, and the wheels made to travel between the rows.

It is another object of the invention to provide an improved device in conjunction with the arched axle of a cultivator, or the like, whereby an adjustment of the wheels and plows may be had while the machine is in motion by simply turning a hand wheel. This is desirable inasmuch as the rows and middles are not regular, and the machine proceeds through the field the operator may turn the hand wheel now in one direction to widen the distance between the ground wheels and between the plows, and again in the opposite direction to draw the plows and wheels nearer together to conform to the character of the ground.

The invention will be more fully understood after reference to the accompanying drawings, in which the like parts are indicated by similar reference symbols throughout the several views, and in which:—

Figure 1 is a plan view, with a portion omitted, of a cultivator constructed according to the present invention.

Figure 2 is a sectional view taken on the line 2—2 of Fig. 1.

Figure 3 is an enlarged vertical sectional view through the improved adjusting device.

Figure 4 is a horizontal sectional view taken on the line 4—4 in Fig. 3.

Figure 5 is a vertical sectional view taken on the line 5—5, also in Fig. 3; and Figure 6 is a sectional view taken on the line 6—6 in Figure 3.

Referring more particularly to the drawings, 1 designates the tongue of the cultivator to which the draft animals are hitched; and 2 and 3 represent shovels or plows, while 4 and 5 show the ground wheels upon which the cultivator is supported.

In accordance with the present invention, the arched axle is made in two sections 6 and 7, having the usual end portions, on which the wheels 4 and 5 are journaled, and the offset parts 8 and 9 to which the shovels or plows 2 and 3 are attached. The upper portions of the axle sections are received in sleeves 9' and 10 and are secured therein, as by bolts or other fastenings 11 and 12. The two sections of the axles are thus made to overlap or to extend in parallelism, and the sleeves 9' and 10, as indicated in Figs. 4 and 6, are provided with racks 13 and 14, having their teeth disposed toward one another, but placed in mesh with a pinion 15 which is fixed to a vertically disposed shaft 16. The shaft 16 is movable vertically and is provided at its upper end with a hand wheel 17 by which the shaft is rotated in either direction. At its lower end the shaft fits in a bearing opening 18, formed in the base of a block 19 which is fitted beneath the tongue 1, and takes the place of the bearing block used at the present time in this location.

The block 19 is provided, as indicated in Fig. 5, with upstanding flanges 20 and 21 which receive and tightly clamp the longitudinal side edges of the tongue 1. Moreover the block is provided with perforated lugs 22 and 23, extending from opposite ends thereof and lying beneath the tongue 1 for the purpose of receiving bolts 24 and 25 which pass upwardly through the tongue, and have nuts 26 and 27 screwed upon their upper threaded ends. The nuts are turned down tightly against a plate 28 which rests upon the upper surface of the tongue 1. The tongue is thus bound about at the portion where the axle connects with the same by strong metallic parts which secure the tongue and axle sections tightly together.

The block 19 is also provided with longitudinally disposed channels 29 and 30, made transversely beneath the tongue 1 for slidably receiving the sleeves 9' and 10, together with their rack portions 13 and 14. The pinion 15 is located in a central recess or socket 31 in the block 19, which opens at its opposite sides into the channels 29 and 30 and permits the teeth of the pinion 15 to engage the teeth of the rack portions 13 and 14.

A toothed wheel 32 is pinned or otherwise secured to the shaft 16 just above the plate 28, and is adapted to receive a pawl or dog 33, formed upon a rock shaft 34, journaled in appropriate bearings 35 upon the plate 28. A handle 36 is attached to the rock shaft 34, and provides for the raising and lowering of the pawl or dog 33 into and out of engagemnt with the toothed wheel 32.

In operation the hand wheel 17, upon rotation in one direction, will cause the rack portions 13 and 14, and the sleeves 9' and 10, carried thereby, to move outwardly in the block 19. The axle sections 6 and 7 are carried with the corresponding sleeves, and the ground wheels 4 and 5 and the plows 2 and 3 are thus made to move farther apart. As a preliminary to this operation, the operator will, of course, lift the handle 36, or kick the same upwardly with his foot to remove the pawl or dog 33 from the toothed wheel 32, as otherwise no movement of the shaft 16 could be had.

In other words, the pawl and toothed wheel provide for the locking of the ground wheels 4 and 5, and the plows 2 and 3 in the position to which they are adjusted. When the hand wheel 17 is rotated in an opposite direction, the pinion 15 will coöperate with the rack portions 13 and 14 and will in this case draw the ground wheels 4 and 5 and the shovels 2 and 3 closer together.

It will be understood that these adjustments may be simply accomplished by the turning of the hand wheel 17 while the machine is actually progressing through the field, or the machine may be set up before going into the field, and with the toothed wheel engaged the parts will not be apt to move out of their adjusted position. However, the machine is very desirable in accomplishing this adjustment quickly in accordance with the irregular character of the middles and hills, or rows, and due to the arrangement of the gears the operation may be manually accomplished in an easy and ready manner.

Moreover, by lifting the hand wheel 17 the shaft 16 will be raised, as will also the ratchet wheel 32 and the pinion 15. A space 37 is provided in the block 19 above the recess 31 in order to receive the pinion 15 when thus raised, and permit of its withdrawal from engagement or mesh with the teeth of the racks. In this position either axle section 6 or 7 may be adjusted back or forth with respect to the other section, and consequently its ground wheel may be moved towards the tongue 1, or the center of the macihne. This adjustment may also be quickly and easily accomplished.

It will be understood that the block 19 is so constructed that it may replace the block at the present time placed beneath the tongue of the cultivator, by which such tongue is connected to the arched axles. Moreover, it will be appreciated that it affords an adjustment while the machine is in progress.

It will be obvious that various modifications might be made in the herein described device, and in the combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. In a cultivator, the combination of a pair of axle sections having their adjacent ends extending side by side in substantially parallel relation, sleeves receiving the adjacent ends of said sections, said sleeves having racks thereon, a pinion meshing with the racks, and means supporting the pinion whereby the pinion may be turned, substantially as described.

2. In a cultivator, a pair of axle sections, sleeves receiving the adjacent ends thereof, a block slidably receiving said sleeves, racks on said sleevs, a pinion meshing in common with the racks and being movable upwardly out of mesh therewith, a shaft carrying said pinion and mounted in the block, a tongue secured to said block, an operating means on the shaft above the tongue, a toothed wheel on the shaft above the tongue, a pivoted pawl cooperating with the toothed wheel, and means whereby the pawl may be moved out of engagement with the toothed wheel, substantially as described.

3. In an agricultural implement having a draft tongue, a pair of offset axle sections in parallel relation beneath the tongue, a block having centering means contacting with the sides of the tongue and fitting against the bottom thereof, said block slidably carrying said axle sections, a plate over the top of the tongue, fastening means passing through the tongue, plate and said block, a liftable shaft inserted through said plate, tongue and block, sleeves secured on the axle sections, means on the shaft having engagement with the sleeves on the axle sections to shift the latter inwardly and outwardly and being disengageable therefrom when lifted, a toothed wheel on the shaft above the plate also liftable with the shaft, and a dog adapted to engage between the teeth, said toothed wheel being disengaged from the dog when the shaft is lifted, and means to rotate and lift the shaft substantially as described.

JOHN B. RILEY.